March 8, 1960

R. F. BENNIE 2,927,747

HELICOPTER LANDING GEAR

Filed April 28, 1955

Inventor
Ralph F. Bennie,
by George H. Baldwin
His Attorney.

March 8, 1960 R. F. BENNIE 2,927,747
HELICOPTER LANDING GEAR
Filed April 28, 1955 3 Sheets-Sheet 3

Inventor
Ralph F. Bennie,
by George H. Baldwin
His Attorney.

United States Patent Office 2,927,747
Patented Mar. 8, 1960

2,927,747

HELICOPTER LANDING GEAR

Ralph F. Bennie, Milton, Fla.

Application April 28, 1955, Serial No. 504,494

11 Claims. (Cl. 244—17.17)

My invention pertains to improved landing gear for helicopters and particularly contemplates landing gear arranged to permit safe landing of a helicopter on an inclined or uneven area of ground or the like.

An object of my invention is to increase the safety of helicopter landing, and more particularly to provide a landing gear system which will operate to compensate for unevenness of the landing terrain and inclination thereof from a horizontal plane.

Helicopter operations have been found to be subject to hazards when landing upon uneven terrain primarily because of the precessional effects of the rotor or rotors. If one part of the helicopter landing gear, for example one or two wheels of a four wheel landing gear, touches ground first and tends to support the helicopter, the helicopter will tend to tilt because of the precessional effect of the rotor. Thus if a nose wheel touches ground first, the helicopter may tend to list sharply to port or starboard depending upon direction of rotor rotation.

A specific object of my invention, accordingly, is to provide a landing gear system for a helicopter which will automatically so adjust itself as to overcome or effectively to reduce the precessional tendencies heretofore associated with landings on uneven or inclined areas.

It is another object of my invention to provide an alternatively operable landing gear system for helicopters which may be used for rough or inclined terrain landings at the will of the pilot but which may be retracted and made inoperative as, for example, to permit landing on conventional wheel and oleo systems.

As used herein, the term helicopter is intended to apply to aircraft which are adapted for vertical landing or take-off, as distinguished from aircraft which require horizontal motion to provide the necessary lift to support the aircraft in the air.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Fig. 3a is a fragmentary detail isometric side view, partially broken away and in section, of a portion of a landing gear assembly in accord with a modification of the invention;

Figure 4:
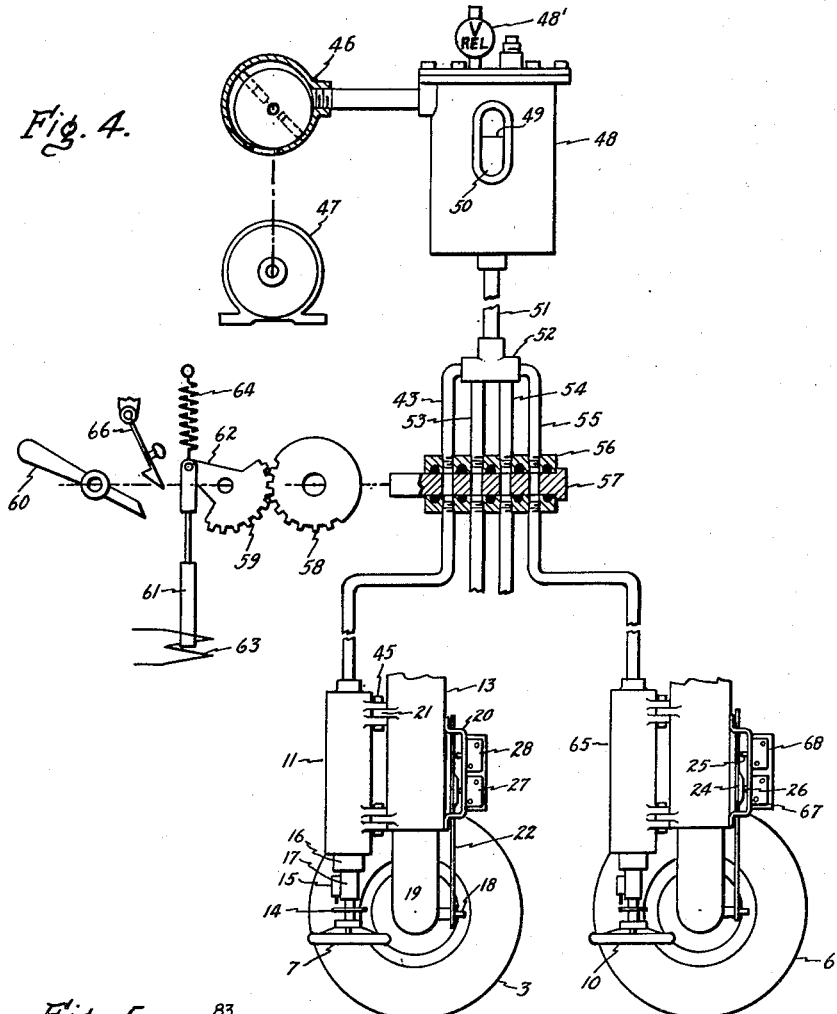
Figure 5:
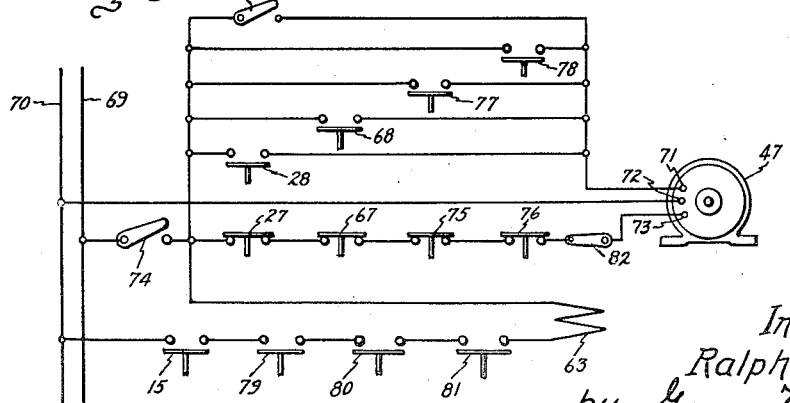

Fig. 4 is a partially sectional and partially diagrammatic side view of portions of the operating and control system associated with two of the four landing gear ground-contacting elements; and Fig. 5 is a diagrammatic view of electric control portions of the landing gear system, including automatically actuated switches for controlling the pump motor and for actuating the coil of a valve solenoid.

Figure 1:
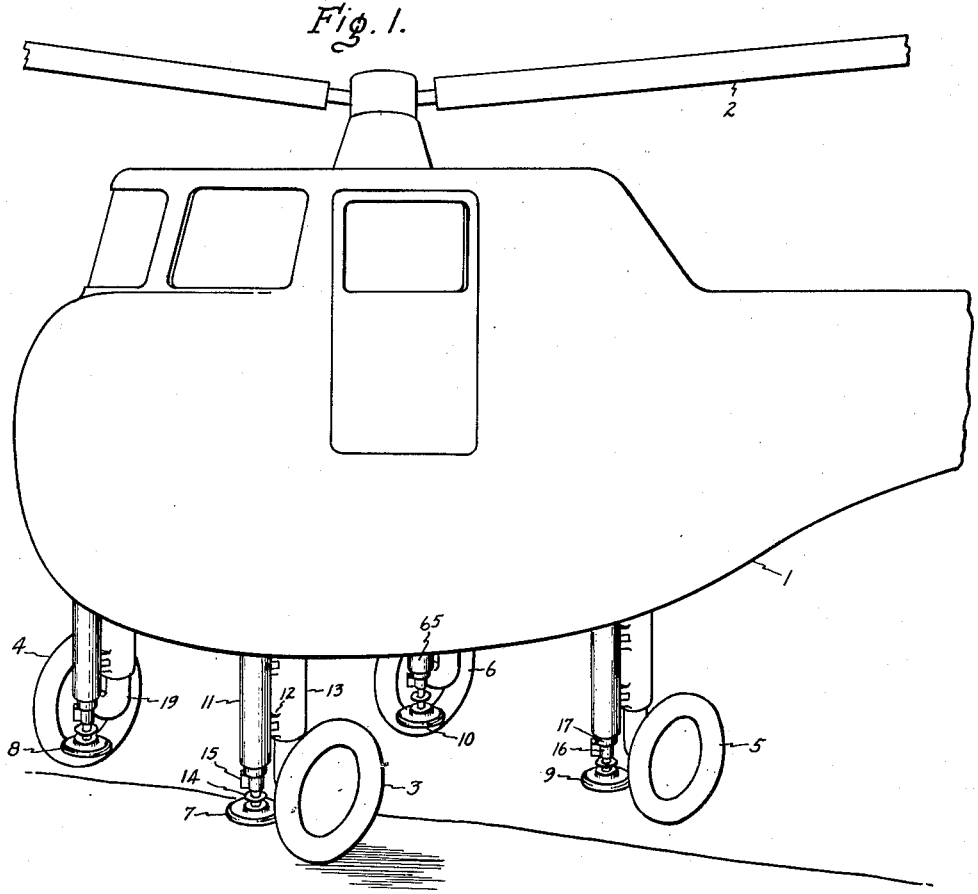
Fig. 1 is a perspective view of a portion of a helicopter showing landing gear in accord with my invention during flight, or, under possible conditions at the moment of touchdown of the left or port front wheel of the landing gear, the auxiliary landing gear elements to which the invention particularly pertains being retracted.

Referring now to Fig. 1, which shows the forward portions of a conventional helicopter body or fuselage 1 attached for lifting to a conventional rotor 2, the landing gear arrangement is seen to comprise four wheels 3, 4, 5 and 6 adjacent each of which is a respective pad 7, 8, 9 and 10. During flight, the pads 7, 8, 9 and 10 are retracted upwardly into the positions shown in Fig. 1. Retraction is accomplished by exhausting a liquid hydraulic medium from telescoping cylinders, a similar cylinder assembly being associated with each pad. Pad 7, for example, is attached at the lower end of a rod extending downwardly coaxially with operating cylinder 11. The cylinder is externally bolted by means of lugs 12, or is otherwise suitably, and preferably removably, attached to the stationary body portion 13 of the conventional oleo strut for wheel 3. The arrangement further comprises a switch-actuating member in the form of a plate or collar 14 and a switch 15 for actuation thereby, these and other details being more clearly seen in Fig. 3 hereinafter described.

The in-flight condition of the landing pads is indicated in Fig. 1. If, prior to landing, all of the pads are extended below the wheels, the operating and control system as hereinafter described will permit each pad as it touches the ground to move upwardly with respect to the settling helicopter body until all four pads are in ground contact, whereupon the pads are all simultaneously locked in position, each supporting substantially the same portion of the weight and maintaining the helicopter body in the generally horizontal position in which it lands with a minimum of precessional reaction. Alternatively and preferably, in preparing for landing the pads remain retracted until one of the wheels touches ground. The wheels in the preferred embodiment and in accord with preferred operation of the invention, serve as parts of terrain contact sensing elements. When a wheel touches ground, controls are actuated to cause the pads to extend downwardly. As each pad reaches the ground, it remains in this position as the other pads continue to move downwardly, until all pads meet the ground, and at this moment, control elements associated with the pads operate to lock all pads simultaneously in the then attained respective positions.

Figure 2:
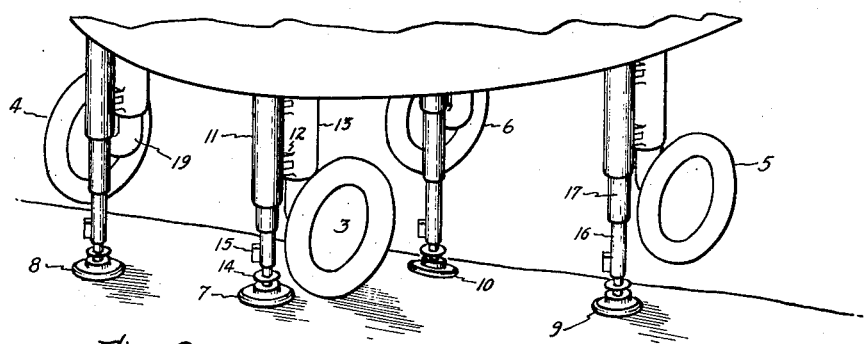
Fig. 2 is a perspective view of a more limited portion of the helicopter and landing gear showing the positions assumed by the landing gear elements of this invention as the landing is completed.

The positions of the several parts of the landing gear when the helicopter has landed on rough or inclined terrain is shown in Fig. 2. The helicopter fuselage 1 is level, or in the position which it would normally assume upon landing on a flat and horizontal landing area, and is supported in this position by the four pads 7, 8, 9 and 10, each pad being in contact with the ground 10'. The connection between each pad and the fuselage, comprising the telescoping members and cylinders, such as members 16 and 17 and cylinder 11 associated with pad 7, is extended to the length required to permit or cause each pad to be in contact with the surface of the ground while providing support to maintain equal or substantially equal weight on each pad and level position of the fuselage.

The telescoping connections, such as the connection comprising elements 11, 16 and 17, are hydraulically controlled, in the herein described preferred embodiment of my invention, and the control system permits of two different pilot-selected landing sequences. According to one sequence, all of the pads may be retracted until one wheel, such as wheel 3, touches the ground. The touchdown of the one wheel may automatically unlock the hydraulically controlled telescoping connection for all four pads simultaneously permitting each pad to fall freely from retracted position of Fig. 1 until each pad makes contact with the ground, as shown in Fig. 2. Then, as the last one of the pads makes contact with the ground, all of the connections are simultaneously locked.

The above mentioned sequence is normally preferred in that the landing will be completed with one landing pad extended a minimum distance below the fuselage, its adjacent wheel being just in contact with the ground, and with the other pads extended just sufficiently below the fuselage to meet the ground and provide appropriate level support of the fuselage.

Figure 3:
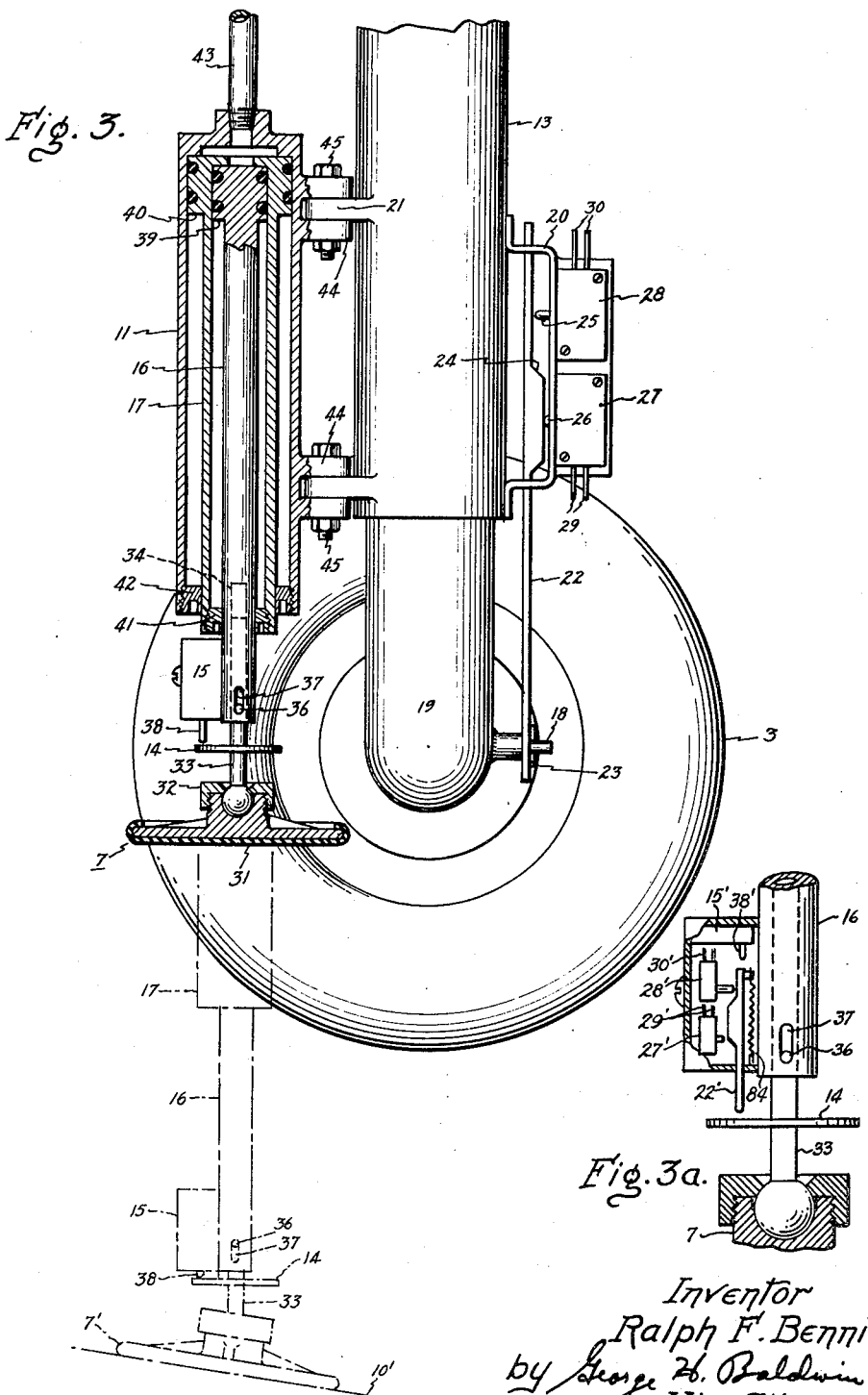
Fig. 3 is a detail isometric side view of a single landing gear wheel and associated landing gear element, in accord with my invention, shown partially in section and on enlarged scale.

The arrangement, which is duplicated for each of the four landing support pads and wheels, is shown in detail in Fig. 3, which it will be assumed is for wheel 3 and pad 7. The wheel 3 is conventional and is mounted to a conventional oleo shock absorber 13, with, however, the addition of a laterally directed pin 18 attached, as by welding, to a portion of the wheel mounting member 19 which, in turn, carries the axle for the wheel, with the addition of a strap or similar switch mounting bracket member 20 attached to the external surface of the oleo cylinder member 13, and with the addition of a pair of bosses 21 extending laterally from the cylinder member 13. It will be understood that the cylinder member 13 of the oleo gear is affixed to the helicopter fuselage and that the portion 19 telescopes into cylinder 13 in a manner to cushion landing shocks.

A vertically disposed rod or strap 22 engages over pin 18 and is held in place thereon by means of a cotter pin 23. The upper portion of strap 22 extends through guide openings in bracket 20 and carries an enlarged or offset cam 24 adapted and arranged to engage movable switch actuating buttons in the nature of cam followers 25, 26. The arrangement is such that when weight is imposed upon wheel 3 during landing, member 19 telescopes into cylinder 13 and cam 24 moves upwardly in bracket 20 to release switch button 26 and to engage and depress switch button 25. The result is that switch 27 opens and switch 28 closes. Electrical conductors 29 lead from switch 27 and conductors 30 lead from switch 28 for connection in the control system diagrammatically shown in Fig. 5, later described.

Fig. 3 incldes details of the landing pad 7, which may have a rubber boot 31 applied to its lower face, and which is mounted preferably through a pivotal ball and socket universal coupling 32 to the lower end of a short shaft 33. The upper end of shaft 33 fits within a limited longitudinal bore 34 in an inner telescoping member 16 which comprises a portion of the extensible connection between the pad and the helicopter body. Shaft 33 is arranged for free though limited longitudinal vertical movement in the bore 34 within which it is engaged, the extent of movement of this slip joint being limited by a pin 36 extending through and attached to shaft 33 and slideable in a slot 37 in member 16. Collar 14 is affixed to shaft 33 in position to engage actuating button 38 of switch 15 in response to upward motion of shaft 33 in bore 34. Thus when pad 7 is in contact with the ground 10', as shown in broken lines at 7' in Fig. 3, the upward movement of shaft 33, and the downward movement of member 16, will cause button 38 to be depressed into the switch closing the circuit thereof.

Inner member 16 of the extensible connection telescopes into intermediate hollow member 17 which, in turn, telescopes into the outer hollow cylinder 11. The upper end of member 16 is formed to provide a piston 39, which may carry suitable sealing rings, and which seals against the internal surface of member 17. Member 17 similarly carries a piston 40 at its upper end sealing within cylinder 11. Thus members 32, 33, 14, 36 and 16 form what may be termed a piston rod assembly connecting pad 7 to piston 39, and these member together with member 17 form a piston rod assembly connecting pad 7 to piston 40. Depending upon the length of cylinder 11 and the length of travel of pad 7 which is needed, member 17 and piston 40 may be eliminated or additional telescoping members may be added to the arrangement shown.

Suitable apertured plugs 41, 42 are arranged in the lower ends of members 17 and 11 to guide the respective members 16 and 17 and to prevent these two movable members from falling out of the assembly upon extension. The plugs do not seal sufficiently tightly against the respective members guided thereby to prevent the free passage of air or to interfere with free sliding of the members therethrough.

Extending from the upper end of the cylinder 11 is a tube or conduit 43 connecting with the hydraulic control system for the extensible pad mounting assembly. Suction applied through tube 43 retracts the pad into the position shown in full lines, while the supplying of hydraulic liquid under positive pressure through the tube exerts force against piston 39 and 40 to extend the members 16 and 17 and the pad 7 downwardly into the positions indicated in dotted lines. It will be understood that tube 43 and the space above pistons 39 and 40 will at all times be filled with hydraulic liquid, such as is normally used in aircraft hydraulic systems, and that the space within the cylinders 11 and 17 and below pistons 39 and 40 will be filled with air. It will immediately occur to those skilled in the art relating to aircraft hydraulic control systems that, as an alternative arrangement, liquid under pressure may be supplied below pistons 39 and 40 to cause retraction of the pad 7 from the broken line position into the solid line position of Fig. 3, rather than effecting retraction through a reduction in positive pressure or increase in negative pressure in the space above the pistons.

The cylinder 11 is rigidly affixed to the fuselage of the helicopter by any desired suitable means, such as by conveniently attaching it to the oleo cylinder, as shown in Fig. 3, by bosses 44 extending from cylinder 11 and connected by bolts 45 to the bosses 21 which extend from the oleo cylinder 13. The oleo cylinders, as mentioned above, are attached to the helicopter fuselage. It is desirable that the extensible connections including the cylinders and pads, such as cylinder 11 and pad 7, should be readily removable from the helicopter, since the landing system of this invention is primarily adapted and intended for landings on rough or inclined terrain, and it may be desired, if extended operation of the helicopter is planned to include only landings on prepared level landing fields, to remove the extensible pads and their connections during the period of such operations. Bosses 21 and 44 and bolts 45 provide rigid attachment of the cylinder 11 to cylinder 13 but permit ready detaching of cylinder 11 when desired.

The hydraulic control system for operation of the extensible landing pad connections is shown in Fig. 4 and comprises a reversible air pump 46 driven by a reversible electric motor 47 and arranged to supply air under pressure to and, upon reverse operation, to exhaust air from a closed hydraulic pressure-vacuum tank 48. The tank is partially filled with hydraulic liquid to the level 49 as seen through glass covered window 50. A pressure relief valve 48' is preferably provided for the tank 48 to prevent the build up of excessive positive pressure therein. A main hydraulic line or tube 51 extends from a lower portion of the tank, so as to be always below the level of liquid therein, to a header 52. Four branch tubes 43, 53, 54 and 55 connect with the header and extend to the four respective extensible connection assemblies through an isolating, pad locking multiple valve 56. The valve comprises four separate passages controlled by a single movable valve member 57 whereby all four lines are simultaneously openable and connected to the header upon one movement of the valve member and simultaneously closable by another motion to isolate and seal off each line from each other and from the header and tank.

The operating mechanism for the movable valve member 57 comprises a gear 58 mounted on and connected to member 57 and a quadrant gear 59 meshing with gear 58. The quadrant gear 59 is rotatable to drive gear 58, and thereby to rotate valve member 57, either through a manual handle 60 or through a solenoid armature 61, the handle being rigidly connected to gear segment 59 and the armature being pivotally connected to an arm 62 of the gear 59. Upon excitation of solenoid coil 63, armature 61 pulls in to rotate gear 59 in a counterclockwise direction as seen in Fig. 4, thereby to turn gear 58 in a clockwise direction and to rotate valve member 57 into valve closing position and to seal or close each of conduits 43, 53, 54 and 55. De-energization of coil 63 thereafter permits tension spring 64 to rotate gears 59, 58 and valve member 57 into the open valve position shown, wherein liquid connections are completed through the conduits between tank 48 and the cylinders 11 and 65, as well as the two other cylinders.

Handle 60 is arranged to rotate with gear 59 during automatic operation of the system without interfering in any way with the operation of the gear. However, should it be desired at any time to close valve 56 and thereby to lock the landing pads in the positions which they occupy at such time, handle 60 may be manually moved, rotating gears 59 and 58 and member 57. A manually actuated catch member 66 may then be brought into engagement with the handle to retain the valve in closed position. Furthermore, if the valve is being held closed by excited solenoid coil 63 and it is desired to open valve 56, the handle 60 can be manually moved against the force of the solenoid to open the valve.

The position of elements in Fig. 4 might correspond to normal flying condition wherein all of the pads, such as pad 7, are retracted, the tank is subjected to suction or less than atmospheric pressure to retain the pads retracted, the motor 47 is operating in the direction to evacuate tank 48, and the wheels, such as wheel 3, are hanging with the oleo gear extended and with the lower switches such as switch 27 closed. During extended periods of flight, it may be desired to operate handle 60 manually to close valve 56, whereby all pads will be locked in retracted position. It is then possible to stop motor 47 until just prior to the next landing. Catch 66, of course, is engaged to retain the handle 60 in its valve closed position. Prior to landing, the handle would be released to return the valve, under the influence of spring 64, to open position, and the motor 47 would be restarted.

Upon landing, the first wheel to touch ground would open its lower switch, such as switch 27 for wheel 3 or switch 67 for wheel 6, and this would cause motor 47 momentarily to stop. Immediately thereafter, the upper switch 28 for wheel 3 or switch 68 for wheel 6 would close and closure of any one such upper switch would start motor 47 in the direction to produce positive pressure in tank 58 permitting pads 7 and 10 and the other two pads to move downwardly.

The switching system for providing automatic control of the landing gear of this invention is shown diagrammatically in Fig. 5. Bus conductors 69 and 70 represent the electrical supply of the helicopter, and it will be assumed that such supply is direct current, although alternating current would be entirely satisfactory if a reversible alternating current motor is substituted for the motor 47 which is here assumed to be for direct current. It will be further assumed that the motor selected has three terminals 71, 72 and 73 and that it will operate in one direction with terminal 72 connected to the other bus wire 69 and that it will operate in the opposite direction when terminal 71 is disconnected and terminal 73 is connected to bus wire 69. Main switch 74 is provided to permit manual disconnection of the whole control system for the landing pads, but this switch will normally be closed except when valve 56 of Fig. 4 is closed. It may be found desirable to interconnect switch 74 for actuation into open condition with the movement of catch member 66 of Fig. 4 into handle locking position, but independent operation of these devices is believed most desirable.

Referring still to Fig. 5, the in-flight condition of the lower wheel-actuated switches 27, 67, 75 and 76 is closed condition, wherein power is supplied, assuming manual switch 74 closed, to terminal 73 from conductor 69. The consequent direction of operation of motor 47 is such as to produce a partial vacuum and to reduce the positive pressure in tank 48 of Fig. 4, thus to raise the landing pads. This is, accordingly, the condition attaining during flight whenever the system is operating.

As the first wheel touches ground, one of series connected switches 27, 65, 75 or 76 is opened, thereby to stop the motor 47, and almost immediately thereafter one of the upper wheel switches 28, 68, 77 or 78 is closed. Since the last mentioned switches are arranged in parallel between terminal 71 and bus wire 69, closure of any one of these switches will re-start the motor 47 in the direction to supply positive pressure, or to decrease the vacuum, in tank 48, thus to initiate lowering of the landing pads.

The landing pad switches 15, 79, 80 and 81 are connected in series to supply, when all are closed, exciting current to solenoid coil 63. Each of the landing pad switches closes in turn as its landing pad reaches the ground under the influence of the increasing positive pressure in tank 48. When the last of the pads meets ground, the last of the landing pad switches will close and coil 63 will then be excited and will actuate its armature to close the pad control valve 56 and lock each pad in its properly extended position. Thereafter, all landing pads will remain in contact with the ground under normal circumstances, each supporting substantially the same amount of weight. If any one of the pads thereafter leaves the ground, coil 63 is deenergized, valve 56 opens again and hydraulic liquid is furnished to lower the one pad not in ground contact and to equalize the weight between the pads, whereupon the coil 63 is again energized to close the valve.

Should the wheel which first engaged the ground leave the ground, or if two wheels met the ground simultaneously, should both leave the ground, all of the lower wheel switches would become closed and all of the upper wheel switches would become open. The motor would be reversed to initiate reduction of positive pressure in the tank 48. If all pads remained in ground contact, nothing further would happen. If a pad left the ground, however, valve 56 would open and the helicopter would sink on those pads which were still supporting the weight until a wheel again established ground contact. The motor would be reversed once more and unless and until all pads were in ground contact, any pads which were too little extended would be moved toward ground contact. It will be seen that valve 56 is opened only when repositioning of one or more pads is required.

It may be found desirable, as soon as all four pads are in contact with the ground, and when handle 60 has been moved automatically by coil 63 into valve-closed position, to lock the handle 60 and valve 56 in this position by means of manual catch 66. The pads are thus locked in their respective positions and the helicopter is supported by the pads on what may be uneven terrain under substantially the conditions which otherwise would be met only on a perfectly flat and smooth landing area.

Upon take-off, catch 66 should be released if it has been engaged with handle 60. As the helicopter rotor begins to lift the weight from the landing pads, switches 15, 79, 80 and 81 open approximately simultaneously, and as the one or more wheels which have been in contact with the ground leave the ground, the closed upper wheel switch, or switches, opens and the lower wheel switches 27, 67, 75 and 76 establish the circuit to terminal 73. The motor is, accordingly, reversed to start reducing the positive pressure in tank 48 and thereby to cause the pads to be retracted.

It has been assumed in the description of the preferred embodiment herein shown that it will be desired to modify existing helicopters as little as possible in adapting the present invention thereto. However, it is by no means essential that the wheels 3, 4, 5 and 6 be provided. While the wheels are utilized as ground sensing devices, other types of ground sensing devices might be employed and it is specifically practical and feasible to omit all of the wheels and to arrange switches 15, 27 and 28, or their equivalents, for actuation by landing pad 7 and to duplicate such arrangement for each of the landing pads. More particularly, as shown in the modification of Fig. 3a, switches 15', 27' and 28' are grouped for actuation by a rod 22' engageable with collar 14 of the landing pad shaft 33. A tension spring 84 urges rod 22' downwardly. Upon meeting the ground, pad 7 is raised slightly with respect to piston rod 16, and as limited by the travel of pin 36 in slot 37, and the raising of the pad causes switch 27' to open and switches 28' and 15' to close. Switches 15', 27' and 28' are connected in the circuit of Fig. 5 in the manner shown for switches 15, 27 and 28 with which they respectively correspond. It will be understood that for this modification, each of the three or more pads provided will be similarly equipped.

In accord with the modification of Fig. 3a, in flight, switches 15' and 28' will remain open. If pad 7 touches ground first, switches 15' and 28' will be closed, and switch 27' opened, valve 56 being open, the remaining pads would be lowered by operation of the pump motor, until all pads came into ground contact closing all switches in series with solenoid coil 63, including switch 15', and closing valve 56. The pump would continue to operate to increase pressure in tank 48 so long as any pad remained in ground contact.

While landed on the pads, if any one left the ground, the motor would continue to operate to build up tank pressure but the solenoid would become deenergized and the valve 56 would be opened until the one pad came again in contact with the ground to close its respective one of the switches through which power is supplied to solenoid 63, such as switch 15', for example.

Thus it will be apparent that either the wheels as shown may be used as ground contact sensing elements, or that the pads themselves, may be so used.

It is believed that the operation of the system in accord with this invention is clearly understandable from the foregoing description. It will be recognized that each of the wheels and pads of the aircraft is similarly equipped. It will be found that certain reference numerals are applied in some figures without specific description in connection with such figures. In each such instance the numerals are applied to assist in a comparison of the figures and an adequate description is elsewhere furnished. Like numerals are used throughout to designate the same element appearing in the several figures.

While the herein described system comprises four landing support assemblies, each comprising the elements such as are identified in Fig. 3 as a cylinder 11, extensible piston members 16 and 17, a landing pad 7 and associated switch 15, and a ground sensing element in the form of wheel 3 with switches 27 and 28, it will be apparent that three such assemblies are adequate to support a helicopter on uneven terrain. It will further be apparent that more than four such assemblies may be employed if desired. It will also be clear that, while the assemblies shown are spaced two at each side of the fuselage, other spacings may be provided. Thus one assembly toward the nose, one toward the rear and one on each side would provide proper operation and support, and if side assemblies are placed toward the nose of the fuselage, a third assembly toward the tail and under the center line of the fuselage would complete an adequate system.

While overriding manual switches by means of which, for example, the pads might be lowered in flight or raised after the helicopter has landed, have not been specifically described above, the provision of appropriate switches may be readily accomplished. For example, an additional normally closed series switch 82 in the connection to terminal 73, as seen in Fig. 5, and an additional normally open parallel switch 83 in the connection to terminal 71, which switches were manually operable, would provide such overriding control. If three, rather than four, landing pads and wheels were provided, for example, and switches 27, 28, 67, 68, 75 and 77 where associated with the wheels, switches 76 and 78 could be arranged for manual operation to effect the overriding control. Handle 60, of Fig. 4, provides manual overriding control of valve 56, and no manual switch is therefore required in the circuit for solenoid 63.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a helicopter, a landing system comprising a plurality of hydraulic expansible chamber means attached to the fuselage of said helicopter and each having a thereto connected respective terrain contacting support element, said means being operative in response to a decrease in positive hydraulic liquid pressure within a chamber of each respective said means to retract the respective said element upwardly toward said fuselage and in response to increase in positive pressure in said chamber to extend said element downwardly from said fuselage, means to control the pressure of hydraulic liquid in said chambers, said last means comprising a terrain contact sensing element responsive to terrain contact to increase positive pressure of hydraulic liquid in said chambers and responsive to the absence of ground contact to decrease positive pressure of hydraulic liquid in said chambers, said last means further comprising means responsive to terrain contact of said terrain contacting support elements to lock said elements in their respective terrain contacting positions.

2. In a helicopter having a fuselage and at least three landing wheels attached through respective resilient mounting means to said fuselage, the combination of at least three extensible landing pad assemblies respectively adjacent said wheels, each said assembly comprising a hydraulic cylinder rigidly attached to said fuselage, a piston in said cylinder and a landing pad member attached to said piston, hydraulic power means connected to said cylinders, valve means interposed between said power means and said cylinders and selectively operable from a first position to interconnect all of said cylinders with said means into a second position to isolate each said cylinder, control means for said hydraulic power means, said control means being connected to said wheels and operative in response to touchdown movement of one of said wheels on its said resilient mounting means to actuate said power means in a direction to lower said pads and in response to take-off of said one wheel to reverse said power means into a direction to raise said pads, and control means for said valve means comprising a respective control element connected to each said pad assembly and each being actuated in response to ground contact of the respective pad from a rest condition into a predetermined actuated condition, said elements being interconnected jointly to operate said valve means into said cylinder isolating position upon concurrence of said actuated condition of all of said elements and individually to release said valve means into said cylinder interconnecting second position upon return of any one said element into its said rest condition.

3. In a helicopter landing system having a landing wheel and an oleo cylinder for said landing wheel disposed generally above said wheel and toward and away from which said wheel is adapted to move, switch means having respective portions coupled to said wheel and to said cylinder and arranged to be operated by the relative motion between said wheel and cylinder, an auxiliary hydraulic cylinder connected to said oleo cylinder in side-by-side relation thereto, a piston in said auxiliary cylinder, a landing pad, a rod assembly attached to said piston within said auxiliary cylinder and extending downwardly below said auxiliary cylinder and attached at a lower end to said pad, said assembly comprising pivotal and slip joint means pivotally mounting said pad and having two portions subject to relative motion with respect to each other in response to ground contact of said pad, switch means mechanically coupled to said portions of said assembly and operable in response to said relative motion thereof, reversible hydraulic power means operatively connected to said auxiliary cylinder and electrically connected for reversing control by said wheel-actuated switch means, and electrically closable valve means interposed in the hydraulic connection between said auxiliary cylinder and said hydraulic power means, said valve means comprising an electrical control circuit including said pad-actuated switch means.

4. In a helicopter landing system having a hydraulic cylinder connected to the underside of the body of the helicopter and a piston in said cylinder, a landing pad, a rod assembly attached to said piston within said cylinder and extending downwardly below said cylinder and attached at a lower end to said pad, said assembly comprising pivotal and slip joint means pivotally mounting said pad and having two portions subject to relative motion with respect to each other in response to ground contact of said pad, switch means mechanically coupled to said portions of said assembly and operable in response to said relative motion thereof, reversible hydraulic power means operatively connected to said cylinder, electrically closable valve means interposed in the hydraulic connection between said cylinder and said hydraulic power means, and an electrical control circuit connected to said valve means and comprising said pad-actuated switch means.

5. In a helicopter landing system having a landing wheel and an oleo cylinder for said landing wheel disposed generally above said wheel and toward and away from which said wheel is adapted to move, switch means having respective portions coupled to said wheel and to said cylinder and arranged to be operated by the relative motion between said wheel and cylinder, an auxiliary hydraulic cylinder connected to said oleo cylinder in side-by-side relation thereto, a piston in said auxiliary cylinder, a landing pad, an extensible piston rod assembly attached to said piston within said auxiliary cylinder and extending downwardly below said auxiliary cylinder and attached at lower end to said pad, said assembly comprising pivotal joint means pivotally mounting said pad, reversible hydraulic power means operatively connected to said auxiliary cylinder and electrically connected for reversing control by said wheel-actuated switch means, and valve means interposed in the hydraulic connection between said auxiliary cylinder and said hydraulic power means.

6. In a helicopter landing system having a hydraulic cylinder connected to and disposed generally below the body of the helicopter and a piston in said cylinder, a landing pad, a rod assembly attached to said piston within said cylinder and extending downwardly below said cylinder and pivotally attached at a lower end to said pad, said assembly comprising slip joint means providing sliding movement between two portions of said assembly in response to ground contact of said pad, control means mechanically coupled to said portions of said assembly and operable in response to said sliding movement, a closed hydraulic reservoir containing air in its upper portion and hydraulic fluid in its lower portion and having its said lower portion operatively connected to said cylinder, selectively operable means connected to said reservoir to increase and decrease selectively the pressure of air in said reservoir, and controllable valve means interposed in the hydraulic connection between said cylinder and said hydraulic power means, said valve means having a control circuit including said pad-actuated control means.

7. In a helicopter, a landing support pad, extensible mounting means for said pad, means to retract said pad, and terrain contact sensing means associated with said pad and operatively connected to control said retracting means.

8. In a helicopter, three spaced landing support members, a respective freely sliding connection between each said member and the helicopter body, locking means for locking said connections against sliding, electrically responsive means for activating said locking means to lock said connections, an electrical circuit for energizing said electrically responsive means, a plurality of series-connected switches in said electrical circuit, means interconnecting said switches and respective ones of said support members for closing said switches when the respective support members contact the ground, whereby upon contact of the ground by all of said support members said circuit is completed to energize said electrically responsive means to actuate said locking means, whereupon said connections are locked in their respective positions then attained to provide fixed ground-conforming support for said helicopter body.

9. In a helicopter, three landing support assemblies, each said assembly comprising a respective freely sliding expansible chamber suspension means, a hydraulic liquid system for said expansible chambers comprising a respective hydraulic conduit for each chamber, valve means for each said conduit and a common source of hydraulic liquid, said valve means being selectively operable to connect all of said conduits to said source and alternately to close said conduits, electrically responsive means operatively connected to said valve means, an electrical circuit for energizing said electrically responsive means, a plurality of switches in said electrical circuit for controlling the operation of said circuit, and means responsive to touchdown of all of said assemblies for closing said switches which closure completes said circuit to said electrically responsive means whereupon said electrically responsive means actuates said valve means to close all of said conduits.

10. In a helicopter, three extensible landing support assemblies attached to the fuselage of said helicopter and each including a normally retracted terrain engageable support member, means connected to said assemblies and operable only upon engagement with terrain for urging all of said support members into downwardly extended positions, and means responsive to terrain contact of said support members for locking said members in their respective extended terrain contacting helicopter supporting positions.

11. In a helicopter landing system a plurality of landing pads, a hydraulic system comprising individual respective hydraulically operated extensible means mounting each said pad to the body of said helicopter, terrain sensing means extending below the fuselage of said helicopter, means responsive to terrain contact by said terrain sensing means for increasing the hydraulic pressure thereby causing said pads to extend downwardly to contact said terrain, and means responsive to the ground contact of all of said pads for locking said pads in their respective ground contacting positions.

References Cited in the file of this patent

UNITED STATES PATENTS

| | | |
|---|---|---|
| 1,021,338 | Rush | Mar. 26, 1912 |
| 1,308,997 | Simmons | July 8, 1919 |
| 1,995,241 | Chavez et al. | Mar. 19, 1935 |
| 2,101,399 | Larsen | Dec. 7, 1937 |
| 2,443,209 | Thornburg | June 15, 1948 |
| 2,587,628 | King | Mar. 4, 1952 |
| 2,630,989 | Sikorski | Mar. 10, 1953 |